US009898148B2

(12) United States Patent
Tanemura et al.

(10) Patent No.: US 9,898,148 B2
(45) Date of Patent: Feb. 20, 2018

(54) CAPACITIVE STEREOSCOPIC IMAGE SENSING

(71) Applicant: SYNAPTICS INCORPORATED, San Jose, CA (US)

(72) Inventors: Tetsuo Tanemura, Yokohama (JP); Wei Lu, Tokyo (JP); Shunsuke Araki, Yokohama (JP)

(73) Assignee: SYNAPTICS INCORPORATED, San Jose, CA (US)

( * ) Notice: Subject to any disclaimer, the term of this patent is extended or adjusted under 35 U.S.C. 154(b) by 43 days.

(21) Appl. No.: 14/723,218

(22) Filed: May 27, 2015

(65) Prior Publication Data

US 2016/0349871 A1 Dec. 1, 2016

(51) Int. Cl.
G06F 3/044 (2006.01)
G06F 3/041 (2006.01)

(52) U.S. Cl.
CPC ............ *G06F 3/044* (2013.01); *G06F 3/0416* (2013.01); *G06F 3/0418* (2013.01); *G06F 2203/04108* (2013.01)

(58) Field of Classification Search
CPC ..................................................... G06F 3/044
USPC ......................................................... 345/174
See application file for complete search history.

(56) References Cited

U.S. PATENT DOCUMENTS

| 8,054,300 | B2 | 11/2011 | Bernstein |
| 8,411,045 | B2 | 4/2013 | Futter |
| 2004/0189616 | A1* | 9/2004 | Gerpheide ............... G06F 3/044 345/174 |
| 2008/0158146 | A1* | 7/2008 | Westerman ........ G06K 9/00375 345/156 |
| 2008/0158172 | A1 | 7/2008 | Hotelling et al. |
| 2008/0309631 | A1 | 12/2008 | Westerman et al. |
| 2010/0026656 | A1 | 2/2010 | Hotelling et al. |
| 2010/0149126 | A1 | 6/2010 | Futter |
| 2010/0292945 | A1 | 11/2010 | Reynolds et al. |
| 2011/0007021 | A1 | 1/2011 | Bernstein et al. |

(Continued)

FOREIGN PATENT DOCUMENTS

KR 20130124084 A 11/2013

OTHER PUBLICATIONS

U.S. Appl. No. 14/448,527 entitled Capacitive Sensors Having Improved Response Symmetry, filed Jul. 31, 2014.

(Continued)

*Primary Examiner* — Nelson Rosario
*Assistant Examiner* — Chun-Nan Lin
(74) *Attorney, Agent, or Firm* — Patterson + Sheridan, LLP

(57) ABSTRACT

This disclosure generally provides an input device with near-field and far-field receiver electrodes. Using resulting signals captured by these receivers, the input device generates a near-field capacitive image and a far-field capacitive image. In one embodiment, the near-field capacitive image contains information identifying a location of an input object in a first plane in free space, while the far-field capacitive image contains information identifying a location of the input object in a second plane in free space. Further, the first and second planes may be parallel planes where the first plane is closer to an input surface of the input device than the second plane. In one embodiment, the input device compares the information in the near-field and far-field images in order to determine a state of the input object.

20 Claims, 12 Drawing Sheets

(56) References Cited

U.S. PATENT DOCUMENTS

| | | | |
|---|---|---|---|
| 2011/0057670 A1* | 3/2011 | Jordan | G06F 3/0416 |
| | | | 324/679 |
| 2011/0148436 A1 | 6/2011 | Dattalo | |
| 2012/0044199 A1 | 2/2012 | Karpin et al. | |
| 2012/0127124 A1 | 5/2012 | Zanone et al. | |
| 2013/0154996 A1* | 6/2013 | Trend | H03K 17/9622 |
| | | | 345/174 |
| 2013/0285972 A1 | 10/2013 | Elias et al. | |
| 2013/0285973 A1 | 10/2013 | Elias et al. | |
| 2013/0293507 A1 | 11/2013 | Singh et al. | |
| 2014/0009428 A1 | 1/2014 | Coulson et al. | |
| 2014/0184552 A1 | 7/2014 | Tanemura | |
| 2014/0306924 A1 | 10/2014 | Lin et al. | |
| 2015/0062019 A1 | 3/2015 | Fredriksen | |
| 2015/0242009 A1* | 8/2015 | Xiao | G06F 3/044 |
| | | | 345/174 |

OTHER PUBLICATIONS

International Search Report and Written Opinion: PCT/US2016/016980, dated Jun. 29, 2016, consists of 14 pages.

\* cited by examiner

CAPACITIVE STEREOSCOPIC IMAGE SENSING

BACKGROUND

Field

Embodiments of the present invention generally relate to input devices that include near-field and far-field receiver electrodes, and more specifically, to evaluating near-field and far-field capacitive images to determine a state of an input object interacting with the input device.

Background of the Invention

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY OF THE INVENTION

One embodiment described herein is an input device that includes a plurality of near-field receiver electrodes, a plurality of far-field receiver electrodes, a plurality of transmitter electrodes, where the near-field, far-field, and transmitter electrodes are disposed one or more substrates and configured to sense input objects in a sensing region. The input device includes a processing system configured to drive a sensing signal onto the transmitter electrodes and generate a near-field capacitive image of the sensing region based on resulting signals received from the near-field receiver electrodes. The processing system is further configured to generate a far-field capacitive image of the sensing region based on resulting signals received from the far-field receiver electrodes and determine a state of an input object interacting with the sensing region by comparing the near-field image describing the input object with the far-field image describing the input object.

Another embodiment described herein is a method that includes driving a sensing signal on a plurality of transmitter electrodes, receiving resulting signals from a plurality of near-field receiver electrodes, and receiving resulting signals from a plurality of far-field receiver electrodes. The method includes generating a near-field capacitive image of a sensing region of an input device based on resulting signals received from the near-field receiver electrodes, generating a far-field capacitive image of the sensing region based on the resulting signals received from the far-field receiver electrodes, and determining a state of an input object interacting with the sensing region by comparing the near-field image describing the input object with the far-field image describing the input object.

Another embodiment described herein is a processing system that includes a connection interface configured to couple to a plurality of transmitter electrodes, a plurality of near-field receiver electrodes, and a plurality of far-field receiver electrodes disposed within a sensing region and a sensor module configured to drive sensing signals onto the plurality of transmitter electrodes, receive resulting signals from the plurality of near-field receiver electrodes, and receive resulting signals from the plurality of far-field receiver electrodes. The processing system includes a determination module configured to generate a near-field capacitive image based on the resulting signals received from the near-field receiver electrodes, generate a far-field capacitive image of the sensing region based on the resulting signals received from the far-field receiver electrodes, and determine a state of an input object interacting with a sensing region by comparing the near-field image describing the input object to the far-field image describing the input object.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1A:
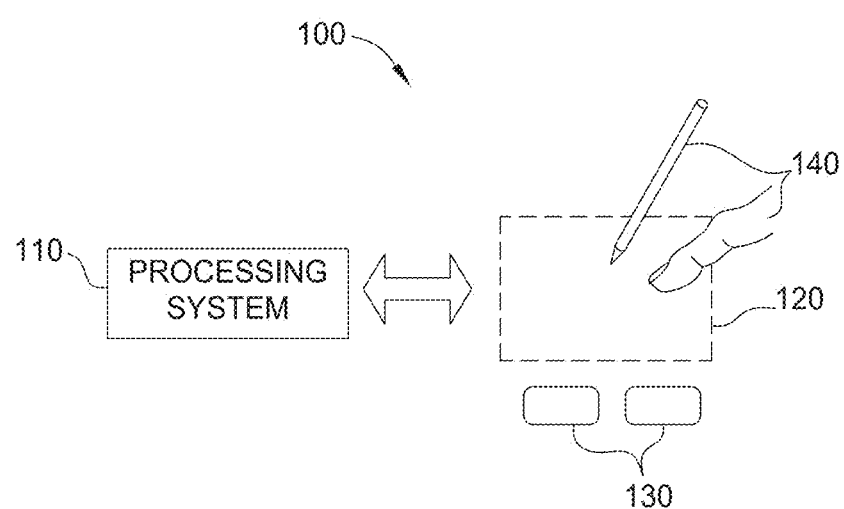
FIGS. 1A and 1B are block diagrams of exemplary systems that include input devices in accordance with embodiments of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present invention provide an input device with near-field and far-field receiver electrodes. Using resulting signals captured by these receivers, the input device generates a near-field capacitive image and a far-field capacitive image. In one embodiment, the near-field capacitive image contains information identifying a location of an input object in at least a first plane in free space, while the far-field capacitive image contains information identifying a location of the input object in at least a second plane in free space. Further, the first and second planes may be parallel planes where the first plane is closer to an input surface of the input device (also commonly referred to as a touch surface) than the second plane.

In one embodiment, the input device compares the information in the near-field and far-field images in order to determine a state of the input object. That is, the information in the near-field and far-field images are used as a capacitive stereoscopic image to provide more information about an input object than if the two images were evaluated independently. For example, by identifying the different locations of the input object in the two planes relative to the input surface, the input device can determine an angle of orientation of the input object. In other examples, comparing the information in the near-field and far-field images may be used to identify a type of the input object (e.g., whether a stylus is contacting the input surface or a finger is hovering over the input surface), classify the input object (e.g., whether a knuckle or fingertip is contacting the touch screen), identify a particular motion of the input object (e.g., a drag versus a pivot-swipe motion), determine a relationship between the input object and water on the input surface, or detect the activation of a display screen. In this manner, generating capacitive images using both near-field and far-field receiver electrodes provide the input device with additional information about the input object that can be used to determine the state of the object.

Turning now to the figures, FIG. 1A is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1A, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1A, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 1B:
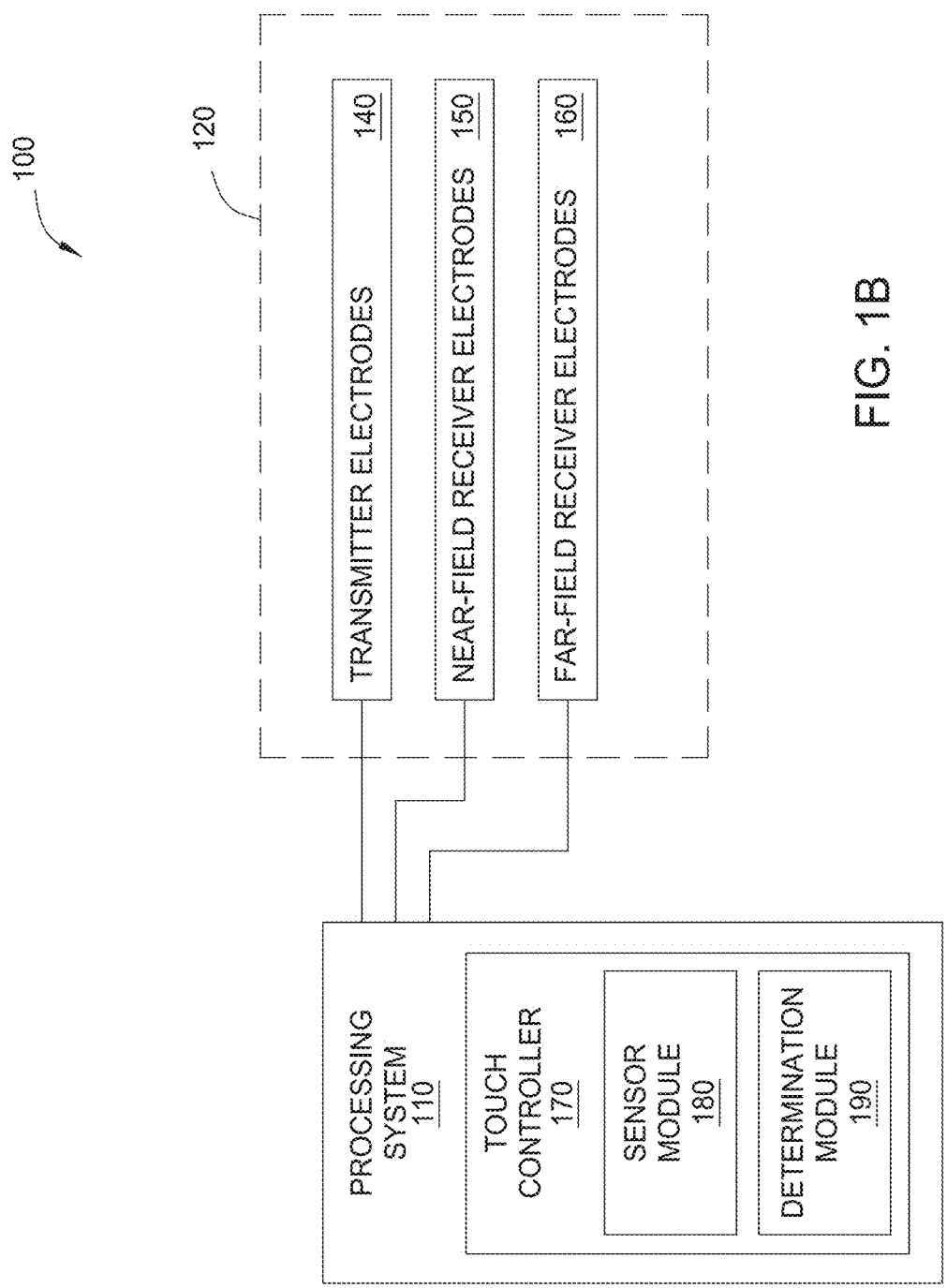

FIG. 1B is a block diagram of an exemplary system that includes an input device 100 in accordance with one embodiment of the invention. As shown, device 100 includes the processing system 110 and sensing region 120. The processing system 110 further includes a touch controller 170 which drives capacitive sensing signals onto transmitter electrodes 140 and receives resulting signals from near-field receiver electrodes 150 and far-field receiver electrodes 160. To do so, the touch controller 170 includes a sensor module 180 which drives the capacitive sensing signal onto the transmitter electrodes 140 and then receives the resulting signals from the near-field and far-field electrodes 150, 160. In one embodiment, the resulting signals provided by the near-field and fair-field electrodes 150, 160 are received simultaneously at the sensor module 180. That is, driving the capacitive sensing signal onto the transmitter electrodes 140 results in both the near-field electrodes 150 and the fair-field electrodes 160 providing resulting signals to the sensor module 180. Alternatively, the sensor module 180 may receive resulting signals from the near-field electrodes 150 and the far-field electrodes 160 at different times. For example, during a first time period, the sensor module 180 drives a capacitive sensing signal on transmitter electrodes 140 and measures the resulting signals on the near-field receiver electrodes 150, while during a second time period, the sensor module 180 drives the capacitive sensing signal on transmitter electrodes 140 but measures the resulting signals on the far-field electrodes 160. Although this may take more time than measuring the resulting signals on the near-field and far-field electrodes 150, 160 simultaneously, one advantage of doing so is the processing system 110 may need fewer input ports that are connected to the sensing region 120—e.g., the ports may be switchably connected to either the near-field or the far-field electrodes 150, 160 depending on which electrodes the resulting signals are currently being sensed.

Based on the received resulting signals, the touch controller 170 includes a determination module 190 that generates a near-field capacitive image and a far-field capacitive image. The near-field image contains information about a first plane (or volume in space) that is at, or close to, an input surface of the input device 100. In contrast, the far-field image contains information about a second plane (or volume in space) that is further away from the input surface than the first plane. Further, the first plane, second plane, and input surfaces may be parallel planes. The information stored in the images may be used to identify a location of the input object relative to the sensing region 120. For example, the sensing region 120 (and the input surface) may be divided into different capacitive pixels defined by the layout of the transmitter electrodes 140, the near-field electrodes 150, and the far-field electrodes 160 in the sensing region 120. By determining the location of the input object in the near-field and far-field images, the determination module 190 can identify a corresponding location (or region) in the sensing region. For example, if the input object contacts the input surface at an angle (i.e., the object is not perpendicular to the input surface), the location of the input object in the near-field image, which is at (or close to) the input surface, is different than the location of the input object in the far-field image, which is further away from the input surface. As described below, the different information about the input object stored in the near-field and far-field images can be used to determine a state of the input object such as identify a type of the input object, classify the input object, identify a particular motion of the input object, determine a relationship between the input object and water on the input surface, or detect the activation of a display screen.

In FIG. 1B, the sensing technique used to generate the near-field and far-field images is a mutual capacitive (or transcapacitive) technique where the sensor module 180 drives capacitive sensing signals onto the transmitter electrodes 140 and measures resulting signals on the near-field and far-field receiver electrodes 150, 160, but this disclosure is not limited to such. In another embodiment, an input device may use self (or absolute) capacitance techniques to generate resulting signals on the near-field and far-field receiver electrodes 150, 160 and determine near-field and far-field capacitive images. However, in one embodiment, regardless whether a mutual capacitance or a self capacitance technique is used, the input device uses the same technique to generate the near-field and far-field capacitive images. Stated oppositely, in this embodiment, the input device would not use a mutual capacitive technique to generate resulting signals on the near-field electrodes 150 but use a self capacitance technique to generate resulting signals on the far-field electrodes 160. Instead, the sensor module 180 generates near-field and far-field images using resulting signals generated by the same capacitance measuring technique. Alternatively, in one embodiment, different capacitance measuring techniques may be used to measure the near-field and far-field images. Or transcapacitive sensing may be used to generate a first near-field and a first far-field image, while absolute capacitive sensing could be used to generate a second near-field image and a second far-field image using the same set of sensing electrodes.

In order to generate capacitive images located at two different planes in free space, the near-field electrodes 150 and far-field electrodes 160 may have different geometries so that these electrodes are sensitive to capacitive changes at planes that are different distances from the input surface. Specifically, the near-field receiver electrodes 150 are sensitive to changes in capacitance along a plane that is closer to the input surface than the far-field receiver electrodes 160. To achieve this effect, the near-field electrodes 150 may have a geometry with a smaller surface area than the far-field electrodes 160.

Figure 2A:
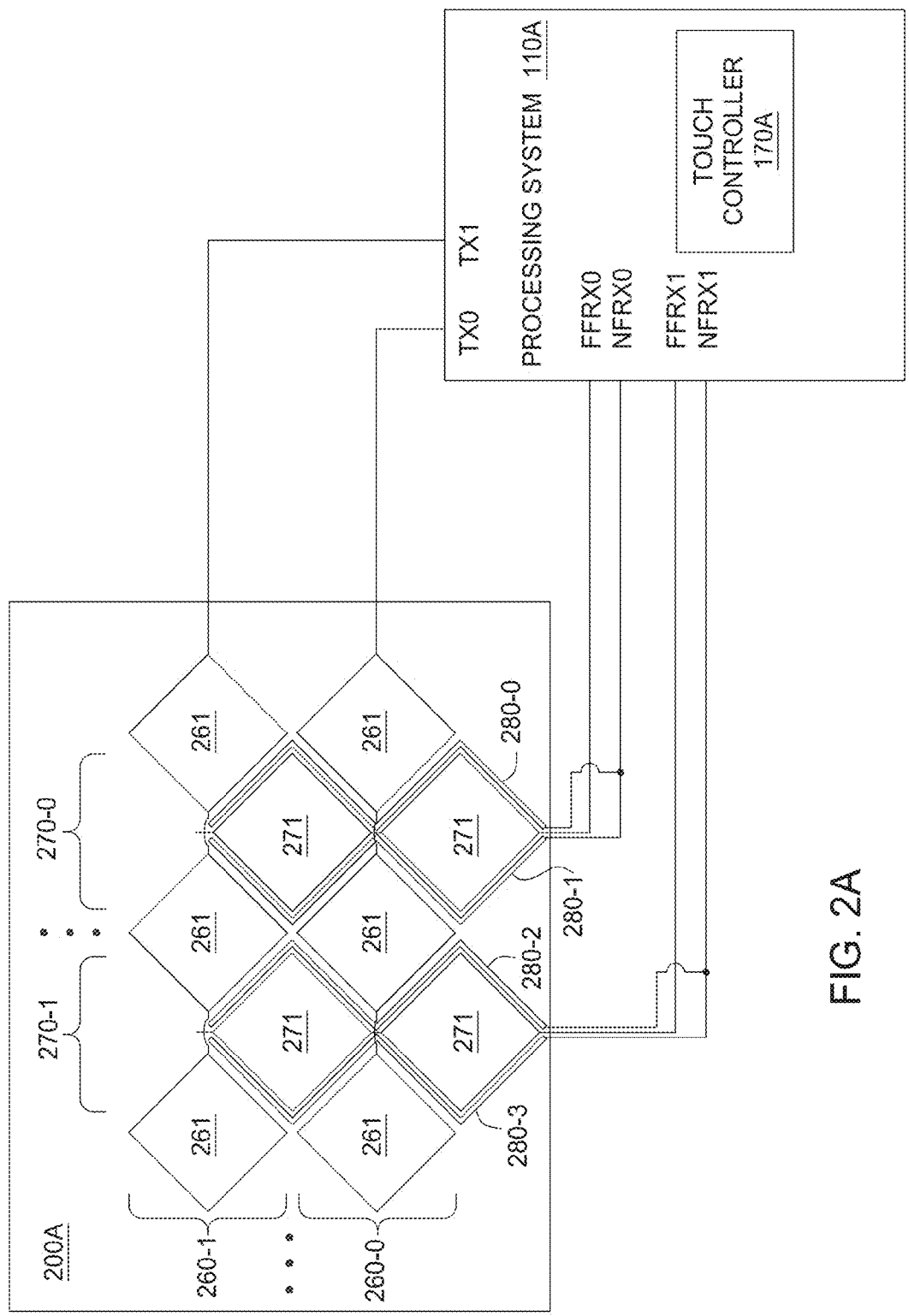
FIGS. 2A and 2B illustrate input devices including near-field and far-field receiver electrodes in accordance with embodiments of the invention.
Figure 2B:
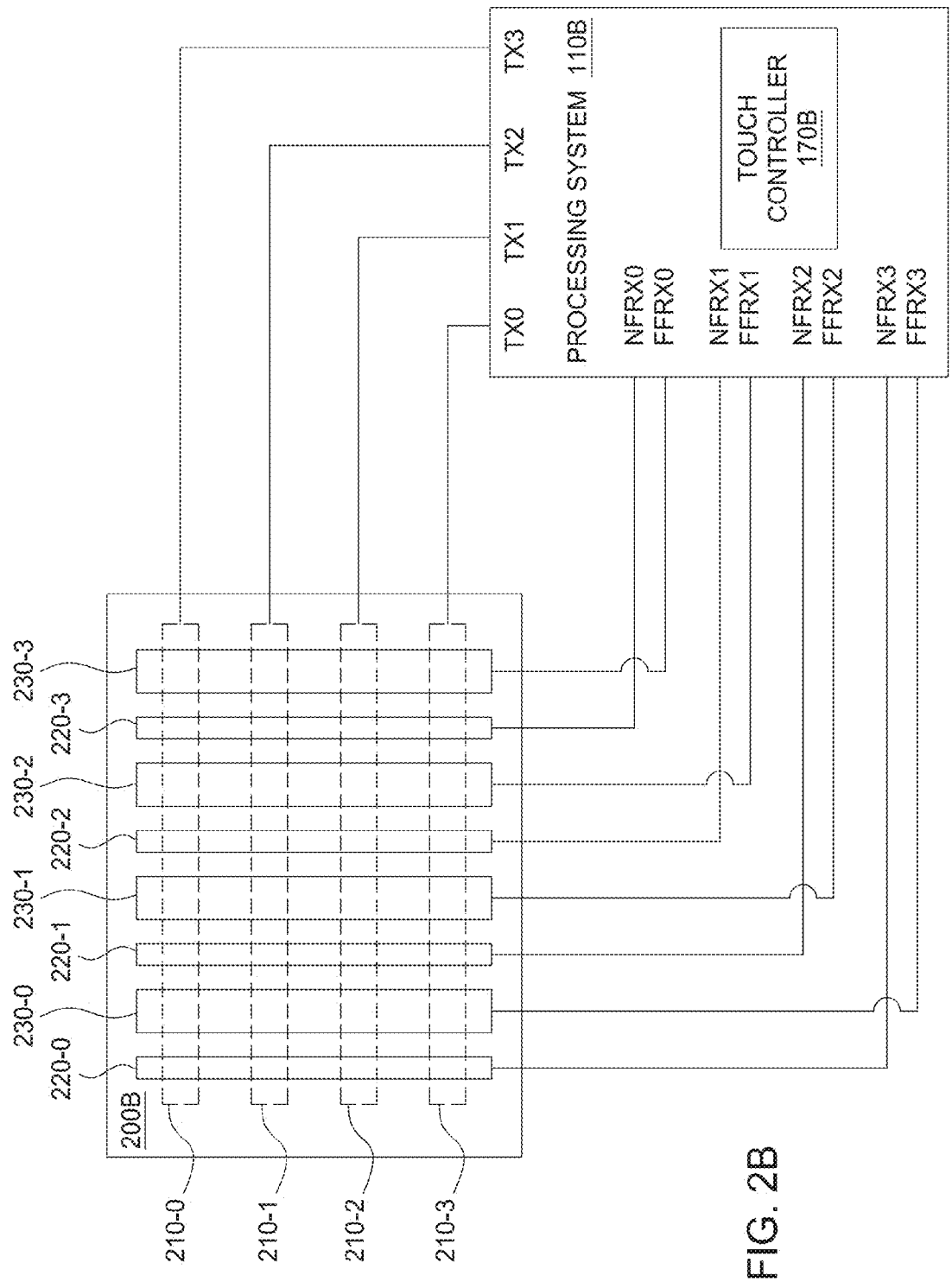

FIGS. 2A and 2B illustrate input devices including near-field and far-field receiver electrodes. FIG. 2A shows a portion of an example sensor electrode pattern 200A which includes both near-field receiver electrodes 280 and far-field receiver electrodes 270, and which may be utilized in a sensor to generate all or part of the sensing region 120 of the input device 100. The sensor electrode pattern 200A includes a plurality of near-field receiver electrodes 280 (280-0, 280-1, 280-3, 280-4, etc.), a plurality of far-field receiver electrodes 270 (270-0, 270-1, etc.), and a plurality of transmitter electrodes 260 (260-0, 260-1, etc.) which may be disposed on a same plane or on different planes. The transmitter electrodes 260 are depicted as being coupled to transmitter outputs (e.g., TX0, TX1, etc.) of processing system 110A, and are used to transmit capacitive sensing signals which result in generating resulting signals on both near-field receiver electrodes 280 and far-field receiver electrodes 270. Far-field receiver electrodes 270 are coupled to far-field receiver inputs (e.g., FFRX0, FFRX1, etc.) of processing system 110A so that far-field resulting signals can be supplied to processing system 100A. Near-field receiver electrodes 280 are coupled to near-field receiver inputs (e.g., NFRX0, FFRX1, etc.) of processing system 110A so that near-field resulting signals can be supplied to processing system 110A. Processing system 110A can receive near-field resulting signals and far-field resulting signals at different times or simultaneously.

As depicted in FIG. 2A, a plurality of diamond shaped electrode elements 271 are ohmically coupled with one another to form a far-field receiver electrode 270 (e.g., 270-0), and a plurality of diamond shaped electrode elements 261 are ohmically coupled together to form a transmitter electrode 260 (e.g., 260-1). In one embodiment transmitter electrodes 260 and far-field receiver electrodes 270 have similar or identical shape and surface area to one another. In this embodiment, however, near-field receiver electrodes 280 have a different and thinner shape or geometry and a substantially smaller surface area than either transmitter electrodes 260 or far-field receiver electrodes 270. As shown, two near-field receiver electrodes 280 (e.g., 280-0 and 280-1) outline the edges of a far-field receiver electrode 270 (e.g., 270-0) and are between elements 271 of a far-field receiver electrode 270 (e.g., 270-0) and adjacent transmitter electrode elements 261. With respect to surface area, the surface area of any near-field receiver electrode 280 is less than the surface area of any far-field receiver electrode 270. By decreasing the surface area of near-field receiver electrodes 280 as compared to the surface area of far-field receiver electrodes 270, there is a reduction in the excessive electric field lines being coupled back to the near-field receiver electrodes 280 from the transmitter electrodes 261 in response to input object contact with a sensing surface of input device 100. Likewise, the greater surface area of the far-field receiver electrodes 270 allows a greater projection of electric field lines above an input surface for intercept by an input object 100. In other words, the greater surface area of far-field receiver electrodes 270 allows them to more efficiently detect far-field input object interactions, while the comparatively thin shape and smaller surface area of near-field receiver electrodes 280 allows them more efficiently detect near-field input object interactions.

In the illustrated example, a near-field capacitive pixel is centered at each location where a transmitter electrode 260 and a near-field receiver electrode 280 cross; and a far-field capacitive pixel is centered at a location where a transmitter electrode 260 and a far-field receiver electrode 270 cross. It is appreciated that in a crossing sensor electrode pattern, such as the illustrated example, some form of insulating material or substrate is typically disposed between transmitter electrodes 260 and receiver electrodes 270, 280 to prevent ohmic coupling. However, in some embodiments, transmitter electrodes 260 and one or more of far-field receiver electrodes 270 and near-field receiver electrodes 280 may be disposed on the same layer as one another through use of routing techniques, jumpers, and/or selective use of insulating material. In some embodiments transmitter electrodes 260 and one of either near-field receiver electrodes 280 or far-field receiver electrodes 270 are disposed on the same side of a substrate as one another. In some embodiments, all of transmitter electrodes 260, near-field receiver electrodes 280, and far-field receiver electrodes 270 are all disposed on the same side of a substrate as one another. In some embodiments, one or more of transmitter electrodes 260, near-field receiver electrodes 280, and far-field receiver electrodes 270 are disposed on different substrates all together or on different sides of the same substrate. For example, in one embodiment, transmitter electrodes 260 may be disposed on a first side of a first substrate while near-field receiver electrodes 280 and far-field receiver electrodes 270 are disposed on a second and opposing side of the same substrate. In another embodiment, transmitter electrodes 260 may be disposed on a first side of a first substrate while near-field receiver electrodes 280 and far-field receiver electrodes 270 are disposed on the same or opposing sides of a second substrate.

In various embodiments, near-field sensing includes sensing input objects in the sensing region that are in contact with or nearly in contact with (e.g., within about a 10 mm in some embodiments) of an input surface of input device. That is, the capacitive image derived from near-field sensing contains input object information about a plane that is within 10 mm from the input surface. It should be appreciated that the range of near-field sensing above an input surface may be larger or smaller in some embodiments and that, in some embodiments, near-field sensing may include only sensing of input objects that are in contact with an input surface of input device.

In various embodiments, far-field sensing includes sensing input objects in sensing region 120 that are somewhere above, but not in contact with, the input surface. As a non-limiting example, far-field sensing, in one embodiment may take place in a second portion of a sensing region that is between approximately 3 mm and 50 mm above the input surface. That is, the capacitive image derived from performing far-field sensing contains information about a volume in free space that is approximately 3 mm and 50 mm above the input surface relative to a direction perpendicular to the input surface. Although the present embodiments simplify the near-field and far-field images to contain information about a single plane associated with each the near-field and far-field capacitive images, in some embodiments the capacitive images contain information about a volume of free space. It should be appreciated that the lower and upper bounds of a far-field sensing volume may be different in other embodiments and that many different sizes of the far-field sensing volume are possible. For example, in many instances a lower portion of the range of the far-field sensing volume may overlap with some portion of an upper portion of near-field sensing volume. Nonetheless, the far-field sensing volume extends further from an input surface of an input device 100 than the near-field sensing region extends.

Far-field capacitive pixels are areas of localized capacitive coupling between transmitter electrodes 260 and far-field receiver electrodes 270. The capacitive coupling between transmitter electrodes 260 and far-field receiver electrodes 270 changes with the proximity and motion of input objects in the sensing region associated with transmitter electrodes 260 and far-field receiver electrodes 270. In some embodiments, sensor electrode pattern 200A is "scanned" to determine these capacitive couplings. That is, the transmitter electrodes 260 are driven to transmit transmitter signals. Transmitter electrodes 260 may be operated such that one transmitter electrode transmits at one time, or multiple transmitter electrodes transmit at the same time. As described above, a set of measurements from the capacitive pixels form the near-field and far-field capacitive images representative of the capacitive couplings at the pixels.

In one embodiment, instead of the receiver electrode pair 280-0, 280-1 and receiver electrode pair 280-2, 280-3 being coupled to the same input port of the processing system 110A—i.e., NFRX0 and FRX1—each electrode 280 may couple to an individual port. That is, instead of having two connections for the transmitter electrodes 280, the processing system 110A would include four connections, one for each of the transmitter electrodes 280.

FIG. 2B illustrates a sensor electrode pattern 200B coupled to processing system 110B. Unlike the sensor electrode pattern 200A in FIG. 2A, here the pattern 200B includes a bars and stripes arrangement where the transmitter electrodes 210 are rectangles and are orthogonal to the rectangular near-field and far-field electrodes 220, 230. Like in FIG. 2A, here the sensor electrode pattern 220B forms capacitive pixels at the locations where the transmitter electrodes 210 are overlapped by the near-field and far-field electrodes 220, 230.

Moreover, the near-field electrodes 220 have a different geometry than the far-field electrodes 230. That is, even though the shape of the electrodes 220, 230 is that same, the far-field electrodes 230 have a greater surface area in the directions shown than the near-field electrodes 220. This geometric disparity results in receiving resulting signals from the near-field electrodes 220 that can be used to generate a near-field capacitive image for a plane (or volume) that is closer to the input surface than the plane (or volume) of a far-field capacitive image derived from the resulting signals measured from the far-field electrodes 230.

As illustrated using ghosted lines, in this example, the transmitter electrodes 210 are located on a different plane than the near-field and far-field electrodes 220, 230. In one embodiment, the transmitter electrodes 210 are located on a first side of a substrate while the near-field and far-field electrodes 220, 230 are both located on a second, opposite side of the same substrate. In another embodiment, the transmitter electrodes 210 are located on a first substrate while the near-field and far-field electrodes 220, 230 are located on a second substrate. Further still, the near-field electrodes 220 may be located on a same side of the second substrate as the far-field electrodes 230, or the electrodes 220, 230 may be located on opposite sides of the second substrate.

Although a diamond pattern is illustrated in FIG. 2A and a rectangular pattern is illustrated in FIG. 2B, other shapes may be utilized for the transmitter electrodes, far-field receiver electrodes, and near-field receiver electrodes. For example, the transmitter electrodes and far-field receiver electrodes may be a star or elliptical shape while the near-field receiver electrodes are disposed in between.

Figure 3:
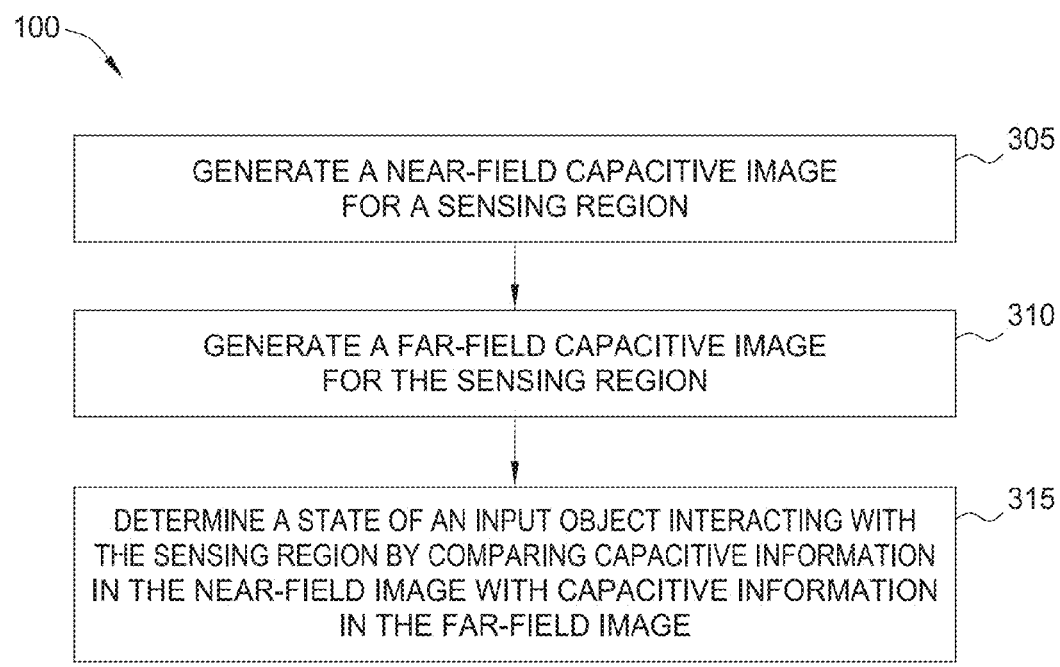
FIG. 3 is a flow chart for determining a state of an input object using near-field and far-field receiver electrodes in accordance with one embodiment of the invention.

FIG. 3 is a flow chart 300 for determining a state of an input object using near-field and far-field receiver electrodes in accordance with one embodiment of the invention. At block 305, the touch controller generates a near-field capacitive image for a sensing region using resulting signals received from near-field receiver electrodes. At block 310 the touch controller generates a far-field capacitive image for the sensing region using resulting signals received from far-field receiver electrodes. In one embodiment, the resulting signals are a result of driving capacitive sensing signals onto transmitter electrodes disposed in the sensing region. Moreover, the shapes of the transmitter, near-field, and far-field electrodes may be any shape or combination of shapes that permit the touch controller to generate capacitive images that contain information regarding different planes or volumes in free space. In one embodiment, the touch controller uses the same capacitive technique to generate the resulting signals provided by the near-field and far-field electrodes, but because the respective geometries of these electrodes are different, the derived capacitive images contain information about different planes or volumes in free space.

At block 315, the touch controller determines a state of an input object interacting with the sensing region by comparing information in the near-field image describing the input object with information in the far-field image describing the input object. For example, the touch controller may evaluate the near-field and far-field capacitive images to determine the location of the input object (relative to the sensing region), size of the input object, identify moisture on the input surface, or detect the activation or deactivation of a display integrated into the input device. Comparing the input object information stored in the near-field image with the input object information stored in the far-field image permits the touch controller to identify a state of the input object. Various states of the input object that can be determined using the method shown in flow chart 300 are provided by the figures below.

Figure 4:
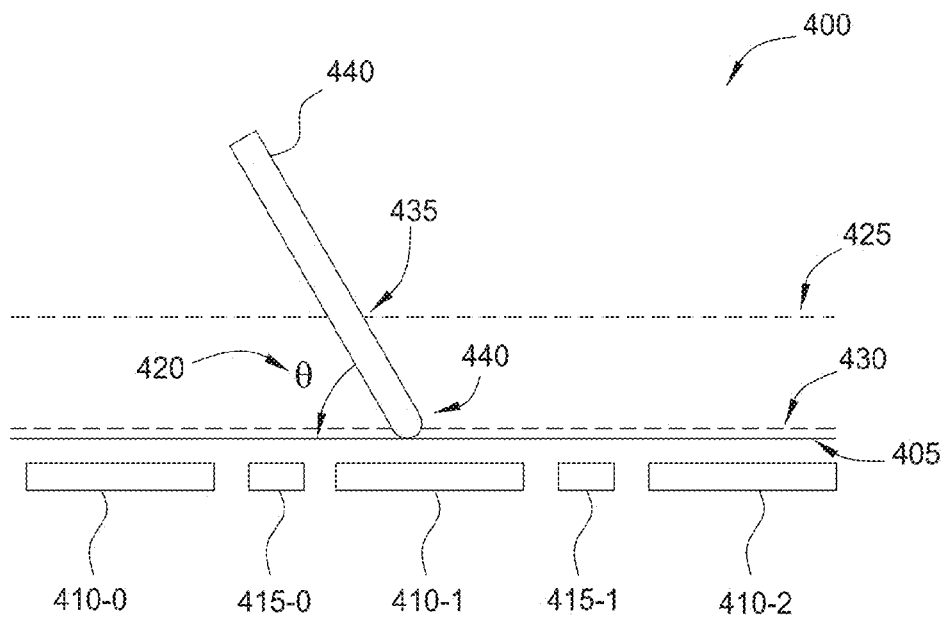
FIG. 4 illustrates using a far-field image and a near-field image to determine a state of an input object in accordance with one embodiment of the invention.

FIG. 4 illustrates using a far-field image and a near-field image to determine a state of an input object. As shown, system 400 includes an input object 440 contacting an input surface 405 of an input device. The input device also includes far-field electrodes 410 and near-field electrodes 415. Using capacitive sensing signals provided by the far-field electrodes 410, a touch controller can derive a far-field capacitive image that contains information about a first plane 425. Similarly, using capacitive sensing signals provided by the near-field electrodes 415, the touch controller can derive a near-field capacitive image that contain information about a second plane 430.

As shown, the input object 440 intersects with the input surface 405 at an offset (or incident) angle 420. A first portion 435 of the input object is located in the first plane 425, while a second portion 440 of the input object is located in the second plane 430. As a result, the far-field capacitive image contains data that the controller can use to determine the location of the first portion 435 relative to the input surface 405 (or sensing region) and the near-field capacitive image contains data that the controller can use to determine the location of the second portion 440 relative to the input surface 405. Because of the offset angle 420, the location of the first portion 435 when projected down onto the input surface 405 is further to the left than the location of the second portion 440 on the input surface 405. As the offset angle 420 increases, the greater the offset between the location of the portion 435 of the input object 440 in the first plane 425 and the location of the portion 440 of the input object 440 in the second plane 430. Using trigonometry, the touch controller can derive the offset angle 420 by comparing the location of the input object in the first plane 425 (which is provided by the far-field image) to the location of the input object in the second plane 430 (which is provide by the near-field image) and estimating the distance between the first and second planes 425, 430. Thus, in the embodiment shown in FIG. 4, the touch controller can identify a state of the input object that describes an offset angle 420 with which the input object 440 contacts the input surface 405.

In one embodiment, once the offset angle 420 in known, the input device may adjust a user interface to ensure the input object 440 is not obstructing the portion of the interface below the object 440. For example, the input device may include a display device integrated with the input surface 405 such that the display device outputs an image that can be seen through the input surface 405. When the input object 440 contacts a portion of the displayed image, the input device can move this portion to a different location that is not obstructed by the input object 440. That is, because the offset angle 420 is known, the input device can determine the direction the input object 440 extends away from the input surface 405, and thus, identify a region in the input surface that is not obstructed by the input object 440. To confirm to the user that she contacted the desired feature in the image (e.g., a button or menu), the input device may display the feature in the non-obstructed region so that the user can visually confirm the correct feature was activated.

In another example, the input device may use the offset angle to zoom the displayed image. For example, the user may keep the second portion 440 of the input device at a fixed location on the input surface 405 but change the offset angle 420. As the angle increases 420, the input device may zoom in on the image at the location where the second portion 440 contacts the input surface 405. As the angle 420 decreases, the input device zooms out relative to the fixed point of contact. These examples are just a few of the different ways that this state on the input object can be used to control the input device.

FIGS. 5A-5E illustrate far-field and near-field images for determining the offset angle. In one embodiment, the capacitive images in FIGS. 5A-5E may have been derived using the system 400 in FIG. 4. In FIGS. 5A-5E, near-field capacitive images 505 are shown side-by-side with far-field capacitive images 510. Both the near-field and far-field images 505, 510 correspond to the same sensing region defined by input surface 405, although the widths of the far-field images 510 are shown in these figures as being smaller than the widths of the near-field images 505 because the far-field images in this example contain fewer intersections between transmitter and receiver electrodes (i.e., fewer capacitive pixels). Nonetheless, when the dimensions are equalized, the near-field and far-field images 505, 510 can be superimposed and compared to identify different locations of the input object in the two images. In other embodiments, the far-field and near-field images may contain the same number of capacitive pixels rather than different numbers as in this embodiment.

Figure 5A:
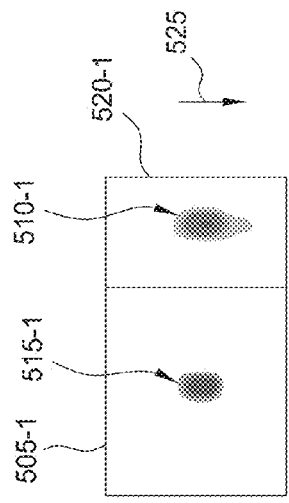
FIGS. 5A-5E illustrate far-field and near-field images for different states of an input object in accordance with one embodiment of the invention.

In FIG. 5A, the input object has a 90 degree offset angle relative to the input surface—i.e., the orientation of the input object is perpendicular to the input surface. Thus, a location 515-0 of the input object relative to the sensing region in the near-field image 505-0 is substantially the same as a location 520-0 of the input object relative to the sensing region in the far-field image 510-0. Because the locations 515-0, 520-0 are similar, the input device may then determine that the offset angle is 90 degrees. That is, the input device is oriented in a direction perpendicular to the input surface.

In one embodiment, the touch controller identifies a location of the input object in each of the capacitive images 505-0, 510-0. The touch controller may then correlate these locations to corresponding locations in the sensing region. For example, the touch controller may assign each of the locations to a particular capacitive pixel or group of capacitive pixels in the sensing region. The controller can then compares the locations in the sensing region to determine the offset angle of the input object. In FIG. 5A, because the locations of the input object when projected onto the sensing region are essentially the same—i.e., locations of the input object in the capacitive images 505-0, 510-0 correspond to the same location (e.g., the same capacitive pixel or pixels) in the sensing region—the touch controller determines the offset angle is 90 degrees.

Figure 5B:
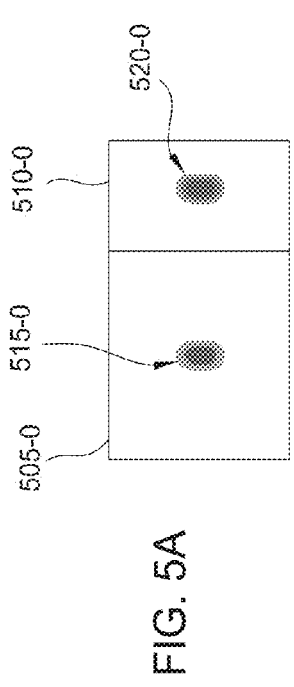

In FIG. 5B, the locations of the input object in the capacitive images 505-1, 510-1 are different. That is, when projected onto the sensing region, the locations of the input object correlate to different locations in the sensing region. In this example, arrow 525 indicates that the location 520-1 of the input object determined by the far-field image 510-1 is further down in the sensing region than the location 515-1 of the input object in the near-field image 505-1. Based on the distance between the two locations, the touch controller can then determine the offset angle of the input object.

Figure 5C:
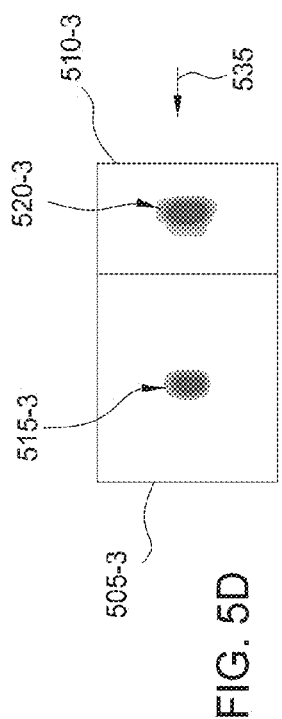

In FIG. 5C, when projected onto the sensing region, the locations 515-2, 520-2 of the input object correlate to different locations in the sensing region. Here, arrow 530 indicates that the location 520-2 of the input object determined by the far-field image 510-2 is further to the right in the sensing region than the location 515-2 of the input object in the near-field image 505-2. Based on the distance between the two locations, the touch controller can determine the offset angle of the input object.

Figure 5D:
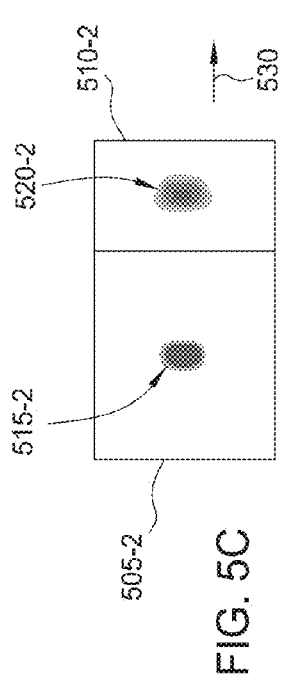

In FIG. 5D, when projected onto the sensing region, the locations 515-3, 520-3 of the input object correlate to different locations in the sensing region. Here, arrow 535 indicates that the location 520-3 of the input object determined by the far-field image 510-3 is further to the left in the sensing region than the location 515-3 of the input object in the near-field image 505-3. Based on the distance between the two locations in the sensing region, the touch controller can determine the offset angle of the input object.

Figure 5E:
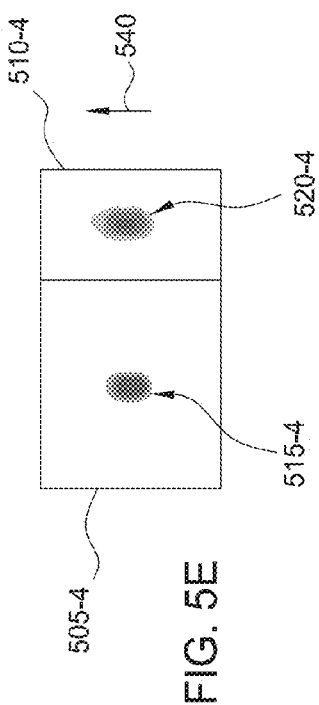

In FIG. 5E, when projected onto the sensing region, the locations 515-4, 520-4 of the input object correlate to different locations in the sensing region. Here, arrow 540 indicates that the location 520-4 of the input object determined by the far-field image 510-4 is further up in the sensing region than the location 515-4 of the input object in the near-field image 505-4. Based on the distance between the two locations, the touch controller can determine the offset angle of the input object.

In contrast, if an input device only relied on near-field images to determine the state of the input object, then it cannot detect the difference between the input object contacting the input surface at a 90 degree angle versus a 45 degree angle. This increased granularity when detecting the state of the input object is referred to herein as disambiguation. That is, the input device is able to compare the information contained in the near-field and far-field images in order to disambiguate states of the input object that may have similar near-field images (or similar far-field images). For example, when the locations 515 of the near-field images 505 in FIGS. 5A-5E are compared, the information contained at these locations is very similar which may make it impossible for the input device to determine anything more than that an input object is proximate to the input surface. However, when the locations 515 are compared to the locations 520 in the far-field images 510, the input object is able to disambiguate these states of the input object by identifying the offset angle.

Figure 6A:
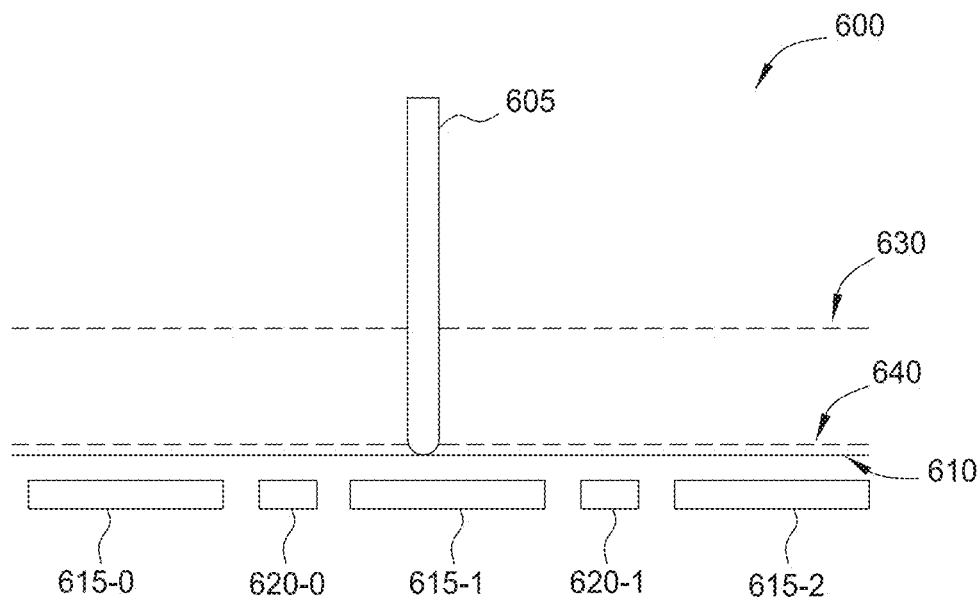
FIGS. 6A and 6B illustrate using far-field and near-field images to determine states of input objects in accordance with embodiments of the invention.
Figure 6B:
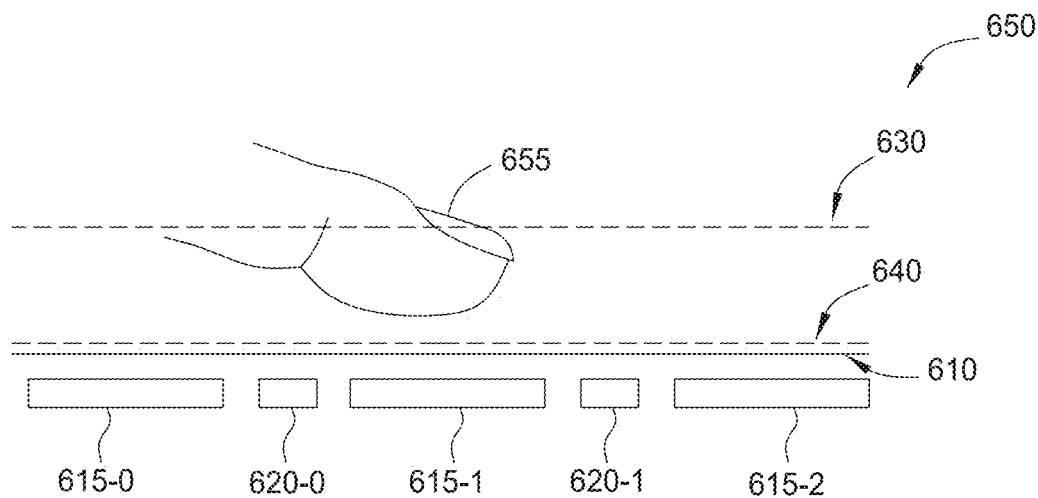

FIGS. 6A and 6B illustrate using far-field and near-field images to determine states of input objects in accordance with embodiments of the invention. System 600 of FIG. 6A includes an input object 605 (shown here as a stylus) interacting with an input surface 610. Specifically, the input object 605 contacts the input surface 610. Using far-field electrodes 615 and near-field electrodes 620, the touch controller can measure capacitance information at two different planes or volumes from the input surface 610. For example, the touch controller uses the resulting signals received from the far-field electrodes 615 to generate a far-field image that includes a first plane 630, while the resulting signals received from the near-field electrodes 620 are used to generate a near-field image that includes a second plane 640 that is closer to the input surface 610 than the first plane 630.

System 650 in FIG. 6B is similar to system 600 except here an input object 655 (i.e., a finger) is hovering over the input surface 610 without making contact with the surface 610. Even though the input object 655 is not located within the second plane 640, nonetheless, the close proximity of the of object 655 to the plane 640 affects the information stored in the near-field image.

Figure 7A:
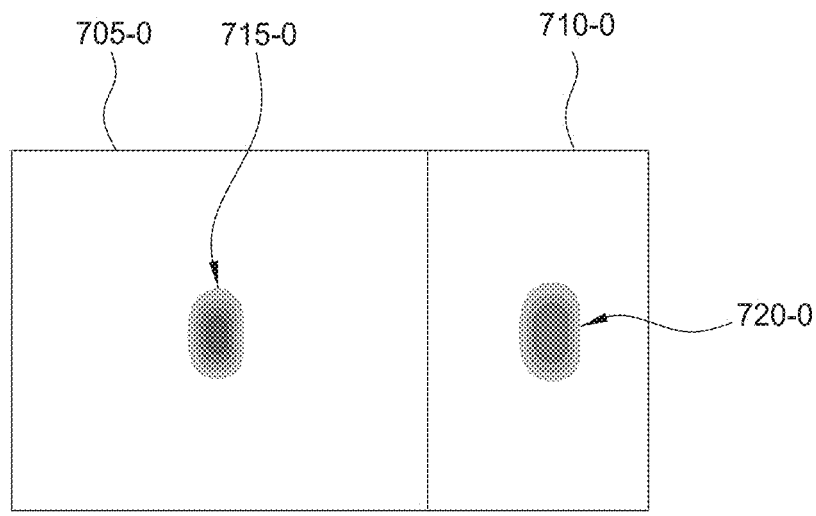
FIGS. 7A and 7B illustrate far-field and near-field images for different states of input objects in accordance with embodiments of the invention.
Figure 7B:
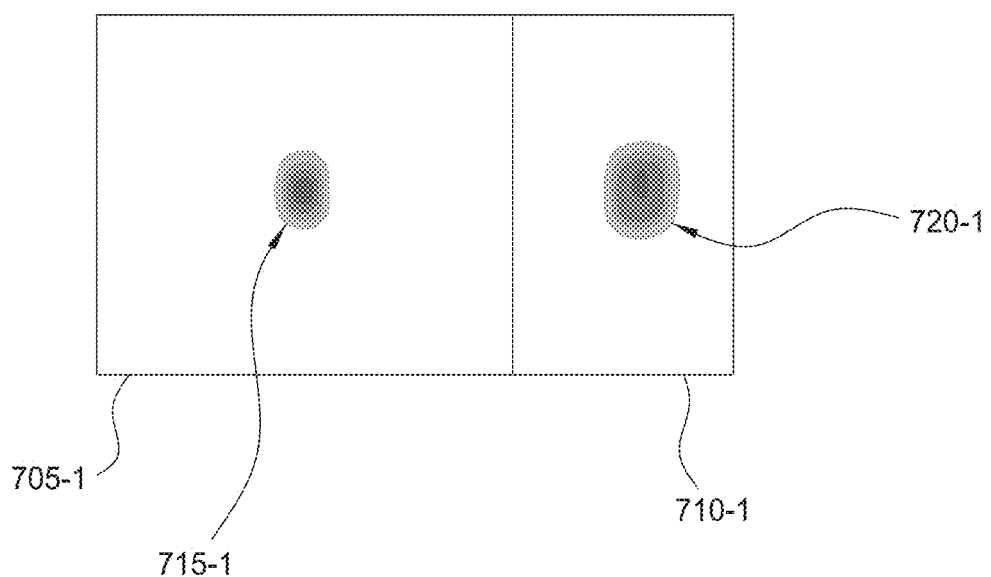

FIGS. 7A and 7B illustrate far-field and near-field images 705, 710 for systems 600 and 650. As shown in FIG. 7A, the near-field image 705-0 includes similar information about the input object 605 as the information shown in the far-field image 710-0. For example, the information at location 715-0 in the near-field image 705-0 has a similar size and field strength value at location 720-0 in the far-field image 710-0. This may indicate that the dimensions of the input object 605 at the first plane 630 are similar to the dimensions of the input object 605 at the second plane 640. As can be seen in FIG. 6A, the diameter of the input object 605 (i.e., the stylus) remains substantially the same as the object 605 extends away from the input surface 610.

In FIG. 7B, the information at location 715-1 in the near-field image 705-1 when compared to the information at location 720-1 in the far-field image 710-1 indicates that the dimensions of the input object 655 (i.e., the finger) change as the input object extends away from the input surface 610. As shown in FIG. 6B, the diameter of the object 655 increases rapidly as the object 655 extends away from the input surface 610.

However, when the information stored at location 715-0 in the near-field image 705-0 of FIG. 7A is compared to the information stored at location 715-1 in the near-field image 705-1 of FIG. 7B, this information is very similar. Thus, if the input device only captured near-field images, it could not detect a difference between a stylus contacting the input surface and a finger hovering over the input surface. However, by evaluating the information contained at the locations 720 in the far-field images 710, the input object is able to disambiguate between these two different scenarios and identify the correct state of the input object.

Figure 8A:
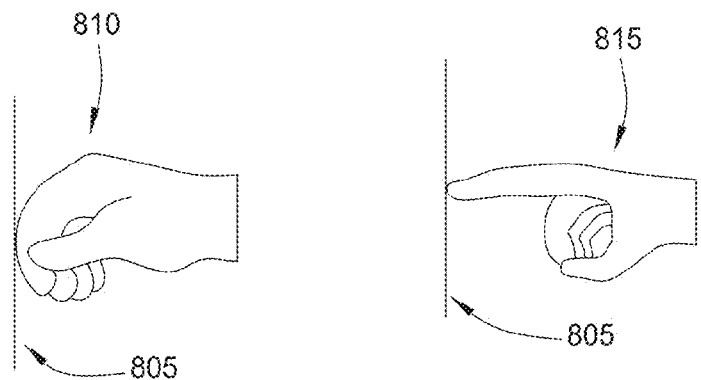
FIG. 8A illustrates different interactions of an input object with a sensing region in accordance with embodiments of the invention.

FIG. 8A illustrates different interactions of an input object with a sensing region in accordance with embodiments of the invention. In one example, the user interacts with an input surface 805 using a bump motion 810 where a knuckle or a back of the hand contacts the surface 805. Alternatively, the user may interact with the input surface 805 using a tap motion 815 where a tip of a finger contacts the surface 805.

Figure 8B:
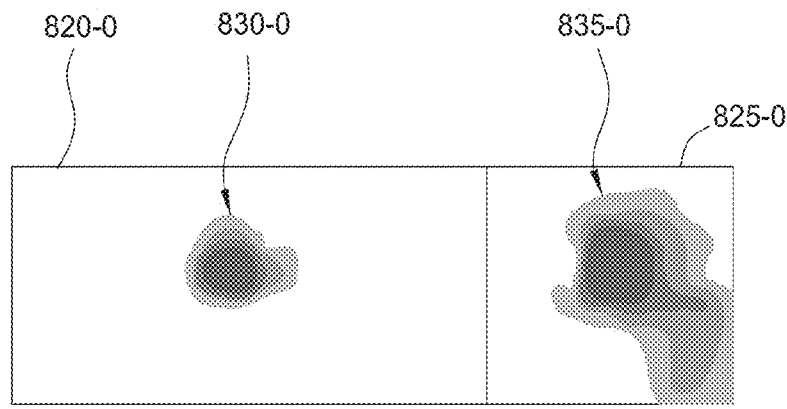
FIGS. 8B and 8C illustrate far-field and near-field images for different states of input objects in accordance with embodiments of the invention.
Figure 8C:
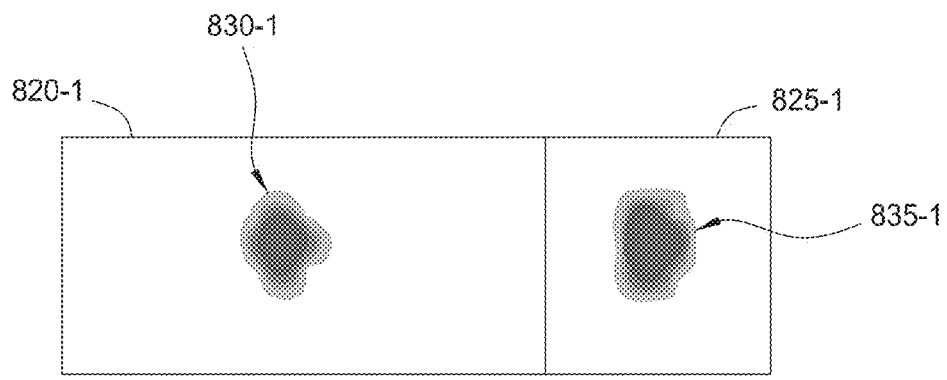

FIGS. 8B and 8C illustrate far-field and near-field images for the two motions 810, 815, respectively. When comparing the information captured in the near-field images 820-0, 820-1, the information is similar. That is, using the information provided at locations 830-0, 830-1, the touch controller may be unable to accurately determine whether the bump motion 810 or the tap motion 815 was used to interact with the input surface 805. For example, any differences in the information at the locations 830 may be attributable to the user using different finger or different types of input objects. However, by comparing the information at the locations 830 in the near-field images 820 with the information at the locations 835 in the far-field images 825, the touch controller can accurately determine that FIG. 8A depicts the bump motion 810 while FIG. 8B depicts the tap motion 815. For instance, although the near-field images 820 are similar, the far-field images 825 are not. When comparing the near-field image 820-0 to the far-field image 825-0, the touch controller may use one or more thresholds to characterize the differences between these images. Because the bump motion 810 results in a much thicker portion of the hand being captured in the far-field image, than the touch controller can determine the current interaction is a bump motion 810. In contrast, although the size of the input object depicted in the far-field image 825-1 in FIG. 8C is larger the size depicted in the near-field image 820-1, this size difference is not as drastic as that shown in FIG. 8B. Thus, by using thresholds when comparing the differences between the near-field images 820 and the far-field images 825, the touch controller can disambiguate a state of an input object that is making the bump motion 810 versus a state of an input object that is making the tap motion 815.

In one embodiment, the touch controller may ignore input provided by the user when the bump motion 810 is detected by responding to input provide when the tap motion 815 is detected. For example, because the bump motion 810 may be too crude of a motion to be able to accurately provide feedback, the touch controller may be configured to classify this motion 810 as a inadvertent touch event—i.e., the user accidentally bumped the input surface 805. However, in other embodiments, the touch controller may use a detection of the bump motion 810 to perform a general function such as putting the input device in a sleep mode or waking up the device from a low power mode, while the tap motion 815 is used to activate a specific feature displayed on the input device at the location where the finger contacts the input surface 805.

Figure 9A:
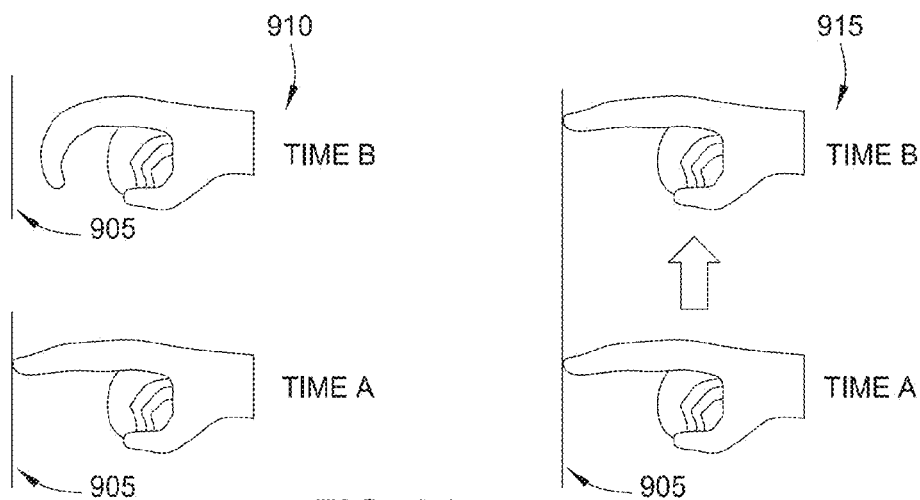
FIG. 9A illustrates different interactions of an input object with a sensing region in accordance with embodiments of the invention.

FIG. 9A illustrates different interactions of an input object with an input surface 905 in accordance with embodiments of the invention. Specifically, the left side of FIG. 9A illustrates a user making a pivot-swipe motion 910 using her finger while the right side of FIG. 9A illustrates the user making a dragging motion 915 using her finger. When performing the pivot-swipe motion 910, at Time A, the user contacts the input surface 905 but at Time B, the finger pivots at a joint such that the user no longer contacts the surface. Instead, the user's hand hovers over the surface 905. When performing the dragging motion, at Time A, the user contacts the input surface 905 at a first location, but at Time B, the user has drug her finger across the surface 905 such that it now contacts a second location.

Figure 9B:
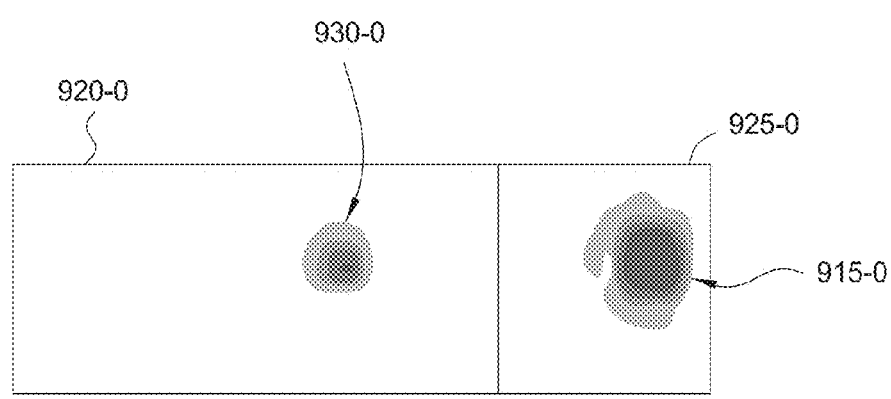
FIGS. 9B and 9C illustrate far-field and near-field images for different states of input objects in accordance with embodiments of the invention.
Figure 9C:
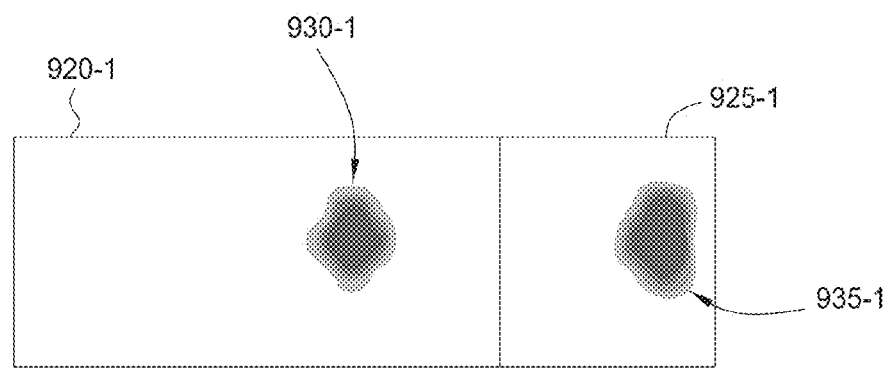

FIGS. 9B and 9C illustrate far-field and near-field images for the pivot-swipe and dragging motions 910, 915. Specifically, FIG. 9A illustrates the near-field image 920-0 and far-field image 925 at Time B when the user's finger is moving away from the input surface 905. Although the near-field and far-field images at Time A of performing the pivot-swipe motion 910 are not shown, they will look very similar to the near-field image 920-1 and far-field image 925-1 shown in FIG. 9B which illustrate the state of the near-field and far-field images when performing the dragging motion 915. By comparing these two figures, the information stored at location 930-0 has a reduced field strength relative to the information stored at location 930-1. This effect is because the tip of the finger is moving away from the near-field close to the input surface 905 thereby reducing the finger's effect on the near-field image 920. Put differently, the effect of the user's finger on the near-field image 920 decreases between Time A and Time B. In contrast, the field strengths at locations 935 in the far-field images 925 may remain similar between Time A and Time B. Thus, by detecting this change in the near-field images 920 and the lack of change in the far-field image 925 over Time A and Time B, the touch controller can identify the pivot-swipe motion 910.

In contrast, when performing the dragging motion 915, the field of strength measured in the near-field images 920 and the far-field images 925 will remain substantially the same—i.e., similar to the information shown in FIG. 9C—but will move to a different location in the sensing region. Thus, by detecting this lack of change in the near-field and far-field images along with a change in the location in the sensing region, the touch controller can identify the dragging motion 915, thereby differentiating between the two motions 910, 915.

Figure 10:
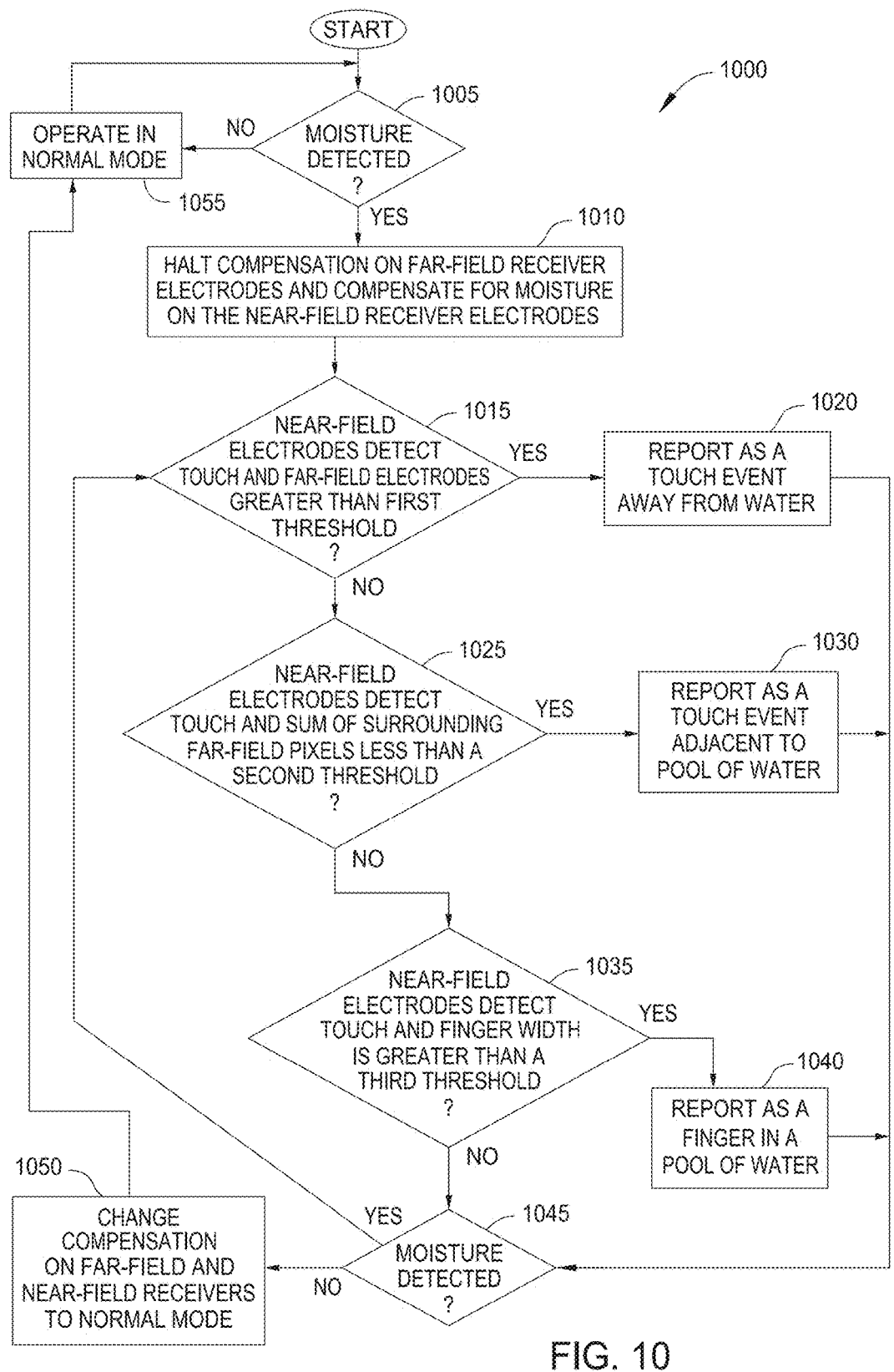
FIG. 10 is a flow chart for determining a relative location of a input object to water on a input surface in accordance with one embodiment of the invention.

FIG. 10 is a flow chart 1000 for determining a relative location of an input object to water on an input surface in accordance with one embodiment of the invention. The chart 1000 begins at block 1005 where a touch controller determines if there is moisture on the screen. In one embodiment, the touch controller uses the far-field images to determine whether water is contacting the input surface (e.g., which include one or more water droplets or the input surface becoming covered with water). Because water naturally has weaker capacitive coupling to ground than a human finger or stylus held by human finger, the capacitive coupling provided by water tends to be an opposite polarity than the capacitive coupling associated with a finger or stylus, which is more prominent in the far-field image than in the near-field image. As such, when water contacts the input surface, the far-field image can be used as a reliable water detector to both estimate amount and location of water. In one embodiment, upon detecting that a predefined number of capacitive pixels in the far-field image report a change in capacitance that exceeds a water threshold (which may be greater than a touch threshold), the touch controller can determine that water is contacting the input surface.

In response to detecting water, the method proceeds to block 1010 where the touch controller stops compensating for noise when processing the signals provided by the far-field electrodes but increases a compensation level when processing the signals provided by near-field electrodes. For example, different noise sources may introduce undesired signals onto the resulting signals received from the near-field and far-field electrodes. Examples of noise sources include an integrated display, changes in temperature, changes in humidity, and the like. The touch controller may use a compensation strategy to remove the effects of these noise sources before generating the near-field and far-field capacitive images. However, when water is detected, the touch controller stops using this compensation strategy when generating the far-field images. As a result, these images include information about the water as well as any input object near the input surface. Thus, the far-field images can be used to capture and track the locations of water on the input surface. In contrast, the touch controller over compensates (relative to normal operation) for the effects of water when processing the signals received from the near-field electrodes. Thus, in one embodiment, the near-field image does not include information about the water on the input surface. Moreover, the touch controller may increase the touch threshold, which results in the touch controller having to detect a larger capacitance change in the near-field images before a touch event is issued.

At block 1015, the touch controller uses the near-field electrodes to detect a location where an input object is proximate to the input surface. That is, because the touch controller is over compensating for water when generating the near-field images, the information stored in these images can be used to determine where an input object is located in the sensing region. In addition, the touch controller correlates this location to a corresponding location in the far-field image. In one example, the touch controller superimposes the far-field image over the near-field image such that each pair of overlapping points in the images correspond to the same location in the sensing region (e.g., a same capacitive pixel). The touch controller determines whether the location in the far-field image that corresponds to the location in the sensing region has a field strength that exceeds a first threshold. For example, the first threshold may be set to correspond to an input object (in contrast to only water) being located at that location. If these two conditions are satisfied—i.e., the near-field image detects an input object and at that same location the field strength in the far-field image exceeds the first threshold, then the flow chart 1000 proceeds to block 1020 where the touch controller reports that an input object has contacted the input surface and that the object is spaced apart a predefined distance (e.g., at least one capacitive pixel of separation) from water contacting the input surface.

If not, the flow chart 1000 proceeds to block 1025 where the touch controller uses the near-field electrodes to again detect when an input object is proximate to the input surface. Moreover, the touch controller may also evaluate the locations in the far-field image that surround (or neighbor) the corresponding location in the near-field image to see if the sum of the field strength in these surrounding locations is less than a second threshold. For example, if the touch controller determines, using the near-field image, that the input object contacted the input surface at a particular capacitive pixel, the touch controller evaluates, using the information in the far-field image, the combined field strength of the surrounding capacitive pixels. If the touch controller detects a touch event using the near-field image and the field strength in the surrounding pixels in the far-field image are less than the second threshold, the flow chart 1000 proceeds to block 1030 where the touch controller reports a touch event that occurs adjacent to a puddle of water disposed on the input surface. That is, the information stored in the far-field image at the surrounding pixels indicates whether the touch event is adjacent to a puddle of water on the input surface.

If both conditions in block 1025 are not true, then flow chart 1000 proceeds to block 1035 where the touch controller again uses the near-field electrodes to detect a touch event. Moreover, the touch controller also uses the near-field image to determine a width of the input object and whether that width is greater than a third threshold. In addition to testing these conditions, the touch controller may also use the far-field image to check an amount of water by counting the number of far-field pixels with water response, to prevent any false positive in light of excessive water. If these three conditions are satisfied, the flow chart 1000 proceeds to block 1040 where the touch controller reports out the touch event as occurring in location of the input surface having a puddle of water disposed thereon. Thus, by using flow chart 1000, the touch controller can differentiate between three different states of the input object: a touch occurring spaced apart from water on the input surface, a touch occurring adjacent to water, and a touch occurring in water.

However, if the three conditions in block 1035 are not satisfied, the chart 1000 proceeds to block 1045 where the touch controller determines whether moisture is on the input surface. For example, the controller may perform the same test that was used in block 1005. If there is still moisture on the input surface, the flow 1000 returns to block 1015 and repeats. However, if the moisture has been removed, the flow chart 1000 proceeds to block 1050 where the compensation strategies for the resulting signals received from the near-field and far-field electrodes that were changed at block 1010 are reverted back to their original settings. That is, the signals received from the far-field electrodes are again compensated in order to remove the effect of the noise sources, while the level of compensation performed on the signals received from the near-field electrodes is reduced since moisture is no longer on the input surface. The flow 1000 then proceeds to block 1055 to operate in a normal mode until moisture is again detected at block 1005.

Figure 11:
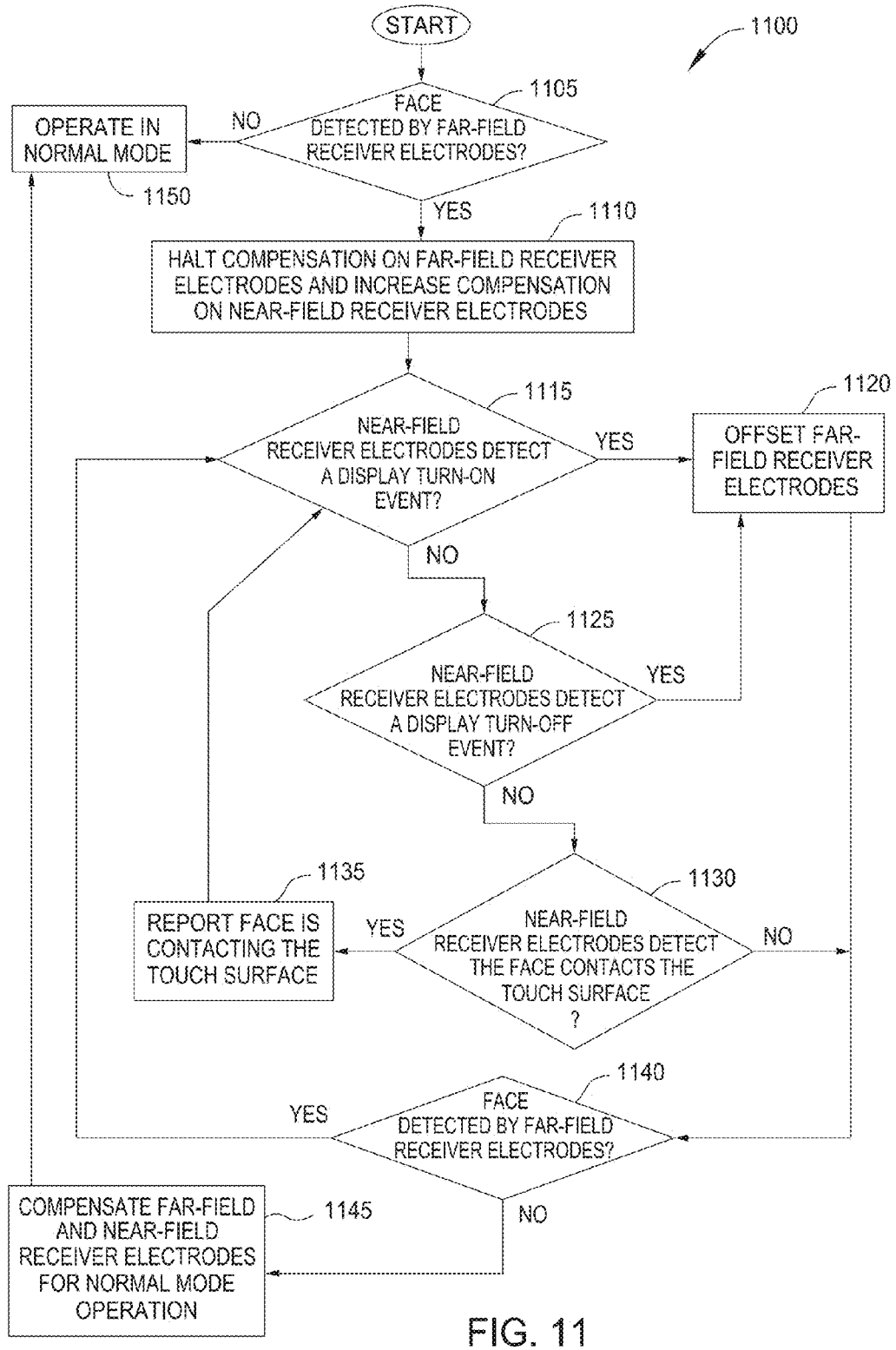
FIG. 11 is a flow chart for modifying a compensation technique based on detecting an activation of a display using the near-field receiver electrodes in accordance with one embodiment of the invention.

FIG. 11 is a flow chart 1100 for modifying a compensation technique based on detecting an activation of a display using the near-field receiver electrodes in accordance with one embodiment of the invention. In one embodiment, the touch controller determines when an integrated display (e.g., a LCD display) has turned on and off and its effect on capacitive sensing. At block 1105, the touch controller uses the resulting signals captured by the far-field electrodes to determine whether a face of the user is detected. For example, because a user's face typically spans multiple capacitive pixels, the touch controller may wait until a predefined number of pixels (e.g., 30% of the capacitive pixels) have a field strength in the far-field capacitive image that exceeds a face detection threshold.

At block 1110, the touch controller stops compensating for noise when processing the signals provided by the far-field electrodes but increases a compensation level when processing the signals provided by near-field electrodes. Halting the compensation technique of the far-field electrodes enables the touch controller to better monitor the location of the face in the far-field. On the other hand, increasing the compensation level for the near-field electrodes permits the touch controller to obtain clean baseline images which can be used to detect shifts in the information stored in the near-field images when the integrated display turns on and off.

At block 1115, the touch controller uses the near-field electrodes to detect when the integrated display turned on (i.e., activated). To do so, the touch controller may subtract minimum field strength values from maximum field strength values at multiple locations in the image to ensure that this difference is within a certain threshold. In this manner, the touch controller can determine that the disturbance is uniform across the touch surface, and thus, indicates that the display is turned on/off rather than a different disturbance caused by a finger. As a second condition, the touch controller determines whether the average field strength value for all the capacitive pixels in the near-field image is less than a second display threshold that corresponds to when the integrated display is activated. If both these conditions are true, then the flow chart 1100 proceeds to block 1120 where an offset is applied to the signals received from the far-field electrodes. In one embodiment, this offset is the average field strength of the capacitive pixels as measured using the near-field image. That is, although at block 1110 the compensation strategy was no longer used to compensate for the signal received on the far-field electrode, at block 1120, the average field strength derived from the near-field image is used to compensate or offset for the effect of the display being activated on the far-field electrodes. That is, the offset removes the effect of the display being activated (which is a source of noise) from the far-field image, thereby improving the ability of the touch controller to detect the presence of the face near the sensing region. The average of the capacitive pixels in the near-field image can be used for this purpose since the near-field image is generally insensitive to an approaching face (i.e., when the face has not yet made contact with the input surface). Thus, the offset permits the touch controller to offset the noise cause by the integrated display and generate information in the far-field image that is affected only by the approaching face and not the display being turned on or off.

If the near-field receivers did not detect the display turn-on event, the flow chart 1100 proceeds to block 1125 where the touch controller uses the near-field electrodes to determine if a turn-off event occurred. Here, the touch controller may again subtract the minimum field strength values from the maximum field strength values at each of the capacitive thresholds to ensure they are less than the first display threshold that was also used in block 1115. However, as a second condition, the touch controller determines whether the average field strength for all the capacitive pixels in the near-field image is less than a third display threshold that corresponds to when the integrated display is deactivated—i.e., turned off. If both these conditions are true, the flow chart 1100 proceeds to block 1120 where the average field strength is used to offset the signals received from the far-field electrodes. However, instead of compensating for a turn-on event, the offset compensates for a turn-off event. Regardless, the same effect is achieved and the touch controller can offset the noise caused by the integrated display and generate information in the far-field image that is affected by the approaching face and not the display being turned off.

If the conditions in block 1125 are not satisfied, the flow chart 1100 proceeds to block 1130 where near-field image is used to determine whether the face contacted the input surface. To do so, the touch controller may determine if the field strength values for all the capacitive pixels in the near-field image are between the second display threshold (which was used in block 1115) and the third display threshold (which was used in block 1125). If so, then the touch controller reports at block 1135 that the face is contacting the input surface. If not, the flow chart 1100 proceeds to block 1140 where the far-field images are used to determine if the face is detected by far-field electrodes—i.e., the touch controller may perform a similar operation as the one described in block 1105. If the face is still detected, the flow chart 1100 returns to block 1115 where the method repeats. If not, the flow chart proceeds to block 1145 where compensation changes made in block 1110 are reverted to their previous settings. That is, the default compensation strategy is resumed on the far-field electrodes and the level of compensation performed on the near-field electrodes is reduced. Normal operation (e.g., normal capacitive sensing using a finger or stylus) is resumed at block 1150 until a face is again detected by the far-field electrodes. Using flow chart 1100, an input device can better detect a state of the input object. In this example, by detecting the activation or deactivation of the integrated display, the touch controller can better detect the presence of the user's face (i.e., an input object) near the input surface.

The figures and embodiments described above provided several examples where the information contained in a near-field capacitive image can be compared to information contained in a far-field capacitive image to detect a state of the object. For example, comparing the information in the near-field and far-field images may be used to identify a type of the input object (e.g., whether a stylus is contacting the input surface or a finger is hovering over the input surface), classify the input object (e.g., whether a knuckle or fingertip is contacting the touch screen), identify a particular motion of the input object (e.g., a drag versus a swipe), determine a relationship between the input object and water on the input surface, or detect the activation of a display screen. However, these are intended as non-limiting examples, and thus, the scope of this disclosure can include many other uses and applications for an input device that can be derived from comparing one or more near-field images with one or more far-field images.

Thus, the embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. An input device, comprising:
 a plurality of near-field receiver electrodes;
 a plurality of far-field receiver electrodes;
 a plurality of transmitter electrodes, wherein the near-field receiver electrodes, the far-field receiver electrodes, and the transmitter electrodes are disposed on one or more substrates and configured to sense input objects in a sensing region; and
 a processing system configured to:
  drive a sensing signal onto the transmitter electrodes;
  generate a near-field capacitive image of the sensing region based on resulting signals received from the near-field receiver electrodes,
  generate a far-field capacitive image of the sensing region based on resulting signals received from the far-field receiver electrodes,
  in response to detecting moisture in the sensing region, stop compensating for noise when processing the resulting signals received from the far-field receiver electrodes and increase a noise compensation level used when processing the resulting signals received from the near-field receiver electrodes, and
  determine a state of an input object interacting with the sensing region by comparing the near-field capacitive image describing the input object with the far-field capacitive image describing the input object.

2. The input device of claim 1, wherein each of the near-field receiver electrodes has a different geometry than each of the far-field receiver electrodes, wherein determining the state comprises at least one of: (i) determining an angle of orientation between the input object and an input surface of the input device and (ii) determining a type of the input object from a plurality of different predefined input object types.

3. The input device of claim 1, wherein the near-field and far-field receiver electrodes are disposed on a same side of one of the substrates.

4. The input device of claim 3, wherein the processing system is configured to process capacitive signals from the near-field receiver electrodes and the far-field receiver electrodes simultaneously.

5. The input device of claim 1, wherein a geometry of the near-field receiver electrodes results in the near-field capacitive image containing input object information associated with a first plane in free space, and a geometry of the far-field receiver electrodes results in the far-field capacitive image containing input object information associated with a second plane in free space that is parallel to the first plane, wherein the first plane is closer to an input surface of the input device than the second plane.

6. The input device of claim 1, wherein the processing system is configured to:
 track a location of the moisture in the sensing region using the far-field capacitive image generated when noise compensation is stopped, and
 superimpose the far-field capacitive image onto the near-field capacitive image to identify a location of the input object in the sensing region relative to the location of the moisture, wherein the near-field capacitive image is generated when noise compensation is increased in response to detecting the moisture.

7. The input device of claim 1, wherein the state of the input object defines a location of a first portion of the input object relative to the sensing region and a location of a second portion of the input object relative to the sensing region, wherein the first portion of the input object is closer to the sensing region than the second portion, and
wherein the processing system is configured to determine an angle of orientation between the input object and an input surface of the input device based on the respective locations of the first and second portions of the input object relative to the sensing region.

8. The input device of claim 1, wherein the processing system, while determining the state of the input object, is further configured to:
detect an activation of a display using the near-field capacitive image;
modify, based on detecting the activation of the display, a compensation technique used to process the resulting signals received by the far-field receiver electrodes; and
determine whether the input object is proximate to the sensing region using the modified compensation technique, wherein the input object is a body part of a user.

9. The input device of claim 1, wherein the state of the input object defines a type of the input object based on comparing a first size value of the input object derived from the near-field capacitive image to a second size value of the input object derived from the far-field capacitive image.

10. The input device of claim 1, wherein the state of the input object defines a motion performed by the input object based on comparing a plurality of near-field capacitive images and a plurality of far-field capacitive images to identify a changing offset between locations of the input object in the plurality of near-field capacitive images and locations of the input object in the plurality of far-field capacitive images.

11. A method, comprising:
driving a sensing signal on a plurality of transmitter electrodes;
receiving resulting signals from a plurality of near-field receiver electrodes;
receiving resulting signals from a plurality of far-field receiver electrodes;
generating a near-field capacitive image of a sensing region of an input device based on resulting signals received from the near-field receiver electrodes;
generating a far-field capacitive image of the sensing region based on resulting signals received from the far-field receiver electrodes;
in response to detecting moisture in the sensing region, stop compensating for noise when processing the resulting signals received from the far-field receiver electrodes and increasing a noise compensation level used when processing the resulting signals received from the near-field receiver electrodes; and
determining a state of an input object interacting with the sensing region by comparing the near-field capacitive image describing the input object with the far-field capacitive image describing the input object.

12. The method of claim 11, wherein a geometry of the near-field receiver electrodes results in the near-field capacitive image containing input object information associated with a first plane in free space, and a geometry of the far-field receiver electrodes results in the far-field capacitive image containing input object information associated with a second plane in free space that is parallel to the first plane, wherein the first plane is closer to an input surface of the input device than the second plane, wherein determining the state comprises at least one of: (i) determining an angle of orientation between the input object and the input surface of the input device and (ii) determining a type of the input object from a plurality of different predefined input object types.

13. The method of claim 11, wherein the resulting signals received from the far-field and the near-field receiver electrodes are received simultaneously.

14. The method of claim 11, wherein the near-field capacitive image contains input object information associated with a first plane in free space and the far-field capacitive image contains input object information associated with a second plane in free space that is parallel to the first plane, wherein the first plane is closer to an input surface of the input device than the second plane.

15. A processing system, comprising:
a connection interface configured to couple to a plurality of transmitter electrodes, a plurality of near-field receiver electrodes, and a plurality of far-field receiver electrodes disposed within a sensing region;
a sensor module configured to:
drive sensing signals onto the plurality of transmitter electrodes,
receive resulting signals from the plurality of near-field receiver electrodes, and
receive resulting signals from the plurality of far-field receiver electrodes; and
a determination module configured to:
generate a near-field capacitive image based on the resulting signals received from the near-field receiver electrodes,
generate a far-field capacitive image of the sensing region based on resulting signals received from the far-field receiver electrodes,
in response to detecting moisture in the sensing region, stop compensating for noise when processing the resulting signals received from the far-field receiver electrodes and increase a noise compensation level used when processing the resulting signals received from the near-field receiver electrodes, and
determine a state of an input object interacting with the sensing region by comparing the near-field capacitive image describing the input object to the far-field capacitive image describing the input object.

16. The processing system of claim 15, wherein the determination module is configured to:
track a location of the moisture in the sensing region using the far-field capacitive image generated when noise compensation is stopped, and
superimpose the far-field capacitive image onto the near-field capacitive image to identify a location of the input object in the sensing region relative to the location of the moisture, wherein the near-field capacitive image is generated when noise compensation is increased in response to detecting the moisture.

17. The processing system of claim 15, wherein a geometry of the near-field receiver electrodes results in the near-field capacitive image containing input object information associated with a first plane in free space, and a geometry of the far-field receiver electrodes results in the far-field capacitive image containing input object information associated with a second plane in free space that is parallel to the first plane, wherein the first plane is closer to an input surface of an input device than the second plane, wherein determining the state comprises at least one of: (i) determining an angle of orientation between an input object and the input surface of the input device and (ii) determining a type of the input object from a plurality of different predefined input object types.

18. The processing system of claim 17, wherein the determination module is configured to identify a location of a first portion of the input object in the first plane based on the input object information in the near-field capacitive image and identify a location of a second portion of the input object in the second plane based on the input object information in the far-field capacitive image.

19. The processing system of claim 18, wherein the first portion of the input object is located a greater distance from the input surface of the input device, relative to a direction perpendicular to the input surface, than the second portion of the input object.

20. The processing system of claim 17, wherein the near-field capacitive image and the far-field capacitive image both contain input object information describing a location of the input object at a same point of time.

\* \* \* \* \*